United States Patent
Hwang

(10) Patent No.: US 9,368,830 B2
(45) Date of Patent: Jun. 14, 2016

(54) BATTERY

(75) Inventor: Cheol-Hee Hwang, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 932 days.

(21) Appl. No.: 13/240,002

(22) Filed: Sep. 22, 2011

(65) Prior Publication Data

US 2012/0115020 A1     May 10, 2012

Related U.S. Application Data

(60) Provisional application No. 61/410,264, filed on Nov. 4, 2010.

(51) Int. Cl.
  *H01M 2/02* (2006.01)
  *H01M 10/04* (2006.01)
  *H01M 6/42* (2006.01)

(52) U.S. Cl.
  CPC ........ *H01M 10/0468* (2013.01); *H01M 10/049* (2013.01); *H01M 10/0413* (2013.01); *H01M 6/42* (2013.01)

(58) Field of Classification Search
  CPC ..................... H01M 10/0468; H01M 10/0413; H01M 10/049; H01M 6/42
  USPC ....................................................... 429/163
  See application file for complete search history.

(56) References Cited

U.S. PATENT DOCUMENTS

| | | | |
|---|---|---|---|
| 6,242,128 B1 | 6/2001 | Tura et al. | |
| 6,432,576 B1 | 8/2002 | Hikmet | |
| 6,620,540 B2 | 9/2003 | Sugita et al. | |
| 6,627,347 B2 | 9/2003 | Fukuda et al. | |
| 6,675,456 B2* | 1/2004 | Pommer | 29/466 |
| 6,680,141 B2 | 1/2004 | Hikmet et al. | |
| 7,179,562 B2 | 2/2007 | Zolotnik et al. | |
| 2005/0202311 A1 | 9/2005 | Higashino et al. | |
| 2007/0026304 A1 | 2/2007 | Jeon et al. | |
| 2007/0111089 A1 | 5/2007 | Swan | |
| 2010/0028769 A1 | 2/2010 | Enomoto et al. | |
| 2010/0047685 A1* | 2/2010 | Lee et al. | 429/176 |

(Continued)

FOREIGN PATENT DOCUMENTS

| | | | | |
|---|---|---|---|---|
| EP | 0 613 200 A1 | 8/1994 | | |
| JP | 59-148280 | 8/1984 | | |
| JP | 59148280 A | * 8/1984 | ............. | H01M 6/46 |
| JP | 07-122287 | 5/1995 | | |

(Continued)

*Primary Examiner* — Karie O'Neill Apicella
(74) *Attorney, Agent, or Firm* — Robert E. Bushnell, Esq.

(57) ABSTRACT

A battery includes an electrode assembly fabricated with a positive electrode, a separator, and a negative electrode, each perforated by corresponding through voids along both of their respective opposite edge margins, stacked one upon another with the corresponding holes aligned. An arrangement of guide portions integrally formed simultaneously together with a surrounding case, accommodates stacking of the electrode assembly during fabrication of the battery. Aspects of the guide portions extend along a direction of stacking of the positive electrodes, negative electrodes and separators. The case and the arrangement of guide portions improve the internal alignment and facilitates the stack ability of electrode assemblies formed by the stacking of positive electrodes, negative electrodes and separators, and enhances the operational stability of the battery and the output performance of the battery, without detracting from the overall compactness of the battery.

19 Claims, 16 Drawing Sheets

(56) References Cited

U.S. PATENT DOCUMENTS

2010/0154205 A1    6/2010  Nakagawa et al.
2012/0107670 A1*   5/2012  Viavattine .................... 429/153

FOREIGN PATENT DOCUMENTS

JP          3673155      4/2005
KR          10-0329855   3/2002

* cited by examiner

BATTERY

CLAIM OF PRIORITY

This application makes reference to, incorporates the same herein, and claims all benefits accruing under 35 U.S.C. §119 from an application entitled BATTERY earlier filed in the U.S. Patent and Trademark Office on the 4 Nov. 2010, and there duly assigned Ser. No. 61/410,264.

BACKGROUND OF THE INVENTION

1. Field of the Invention

The present invention relates to a battery generally, and more particularly, to batteries having an enhanced alignment of separators with positive and negative electrode plates during stacking.

2. Description of the Related Art

Secondary batteries, which used as sources of electrical power in various technical fields for many industries, due to the versatility of secondary batteries, are used not only as energy sources for mobile electronic devices such as digital cameras, cellular phones, and laptop computers, but have more recently been highlighted as energy sources for hybrid electric vehicles that are being proposed as solutions to air pollution caused by the use of fossil fuels such as in gasoline and diesel fueled internal combustion engines.

SUMMARY OF THE INVENTION

One or more embodiments of the present invention include a battery having improved stack ability of electrode assemblies formed by stacking a plurality including a positive plate, a separator, and a negative plate one upon another.

One or more embodiments of the present invention include a battery exhibit improved battery stability and enhanced output performance.

According to aspects of one or more embodiments of the principles of the present invention, batteries may include an electrode assembly including a positive plate, a separator, and a negative plate that are stacked one upon another. A battery case accommodates the electrode assembly, and an arrangement of guide portions integrally formed together with the battery case extends along a direction of stacking of the positive plate, the separator, and the negative plate forming the electrode assembly.

According to one embodiment of the principles of the present invention, an electrode assembly may be constructed with a positive electrode, a negative electrode and a separator disposed between the positive electrode and the negative electrode. The positive electrode, the negative electrode and the separator each bear corresponding through voids perforating opposite edges. A case accommodates the electrode assembly, and a guide portion that has been integrally created simultaneously together with the case on an interior of the case, aligns the separator with the positive and negative electrodes.

According to another embodiment of the principles of the present invention, a guide portion and a case are integrally created simultaneously together as a monolithic structure, with the guide portion having aspects formed in pairs each in juxtaposition to corresponding ones of laterally opposite side walls of the case neighboring the pairs. The aspects have cross-sectional shapes that conform to corresponding discrete through voids that perforate each of the laterally opposite edge margins of each positive electrode, negative electrode and interposed separator to be stacked within the case. These aspects extend substantially perpendicularly from a base of the case, with a majority of surface area of the base being located in between the opposite pairs of the aspects of the guide portion.

According to another embodiment of the principles of the present invention, a battery may be constructed with a guide portion and a case integrally created simultaneously together as a monolithic structure. The guide portion has aspects that are formed in pairs, with each aspect in juxtaposition to a corresponding one of laterally opposite side walls of the case neighboring the pairs. The aspects of the guide portion have cross-sectional shapes that conform to corresponding discrete through voids which perforate each of the laterally opposite edge margins of each positive electrode, negative electrode and interposed separator to be stacked within the case, and extend substantially perpendicularly from a base of the case, with a majority of surface area of the base located in between the opposite pairs of the aspects of the guide portion.

According to one or more embodiment of the present invention, an arrangement of guide portions are arrayed to accurately align the assembly positions of positive electrode plates, negative electrode plates and the separators that are interposed between the positive electrode plates and the negative electrode plates, as the positive electrode plates, negative electrode plates and separators are stacked upon one upon another. After stacking during the fabrication of the battery, the guide portions stabilize the relative positions of the electrode plates and separators so as to maintain the electrode plates and separators without dislocation. This arrangement of guide portions enhances the electrical output productivity of the battery.

In addition, the alignment between the positive electrode plate, the negative electrode plate and the separator is minimized, and is not dislocated, and the relative positions of the electrode plates and separator are fixed by the guide portions are not shifted when the battery is subjected to an occurrence of oscillation or shock from a source external to the battery, and thus, an electric short that may otherwise occur between a positive plate and a negative plate due to the dislocation of the separator, may be prevented. Accordingly, stability of a battery may be improved.

In particular, with the incorporation of the arrangement of the guide portions into a high-capacity, medium-to-large sized battery, the separator may be prevented from sliding or twisting away from a correctly aligned optimal position after a long period of use or due to a radical change in the external environment of the battery. Thus, stability may be significantly increased. Also, the introduction of the guide portions can forestall an increase in the internal resistance that may otherwise occur in a battery due to the formation of wrinkles in the separator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 12 A is a plan view illustrating an alternative embodiment of an electrode plate;

FIG. 12 B is a plan view illustrating an alternative embodiment of an electrode plate;

DETAILED DESCRIPTION OF THE INVENTION

Figure 1:
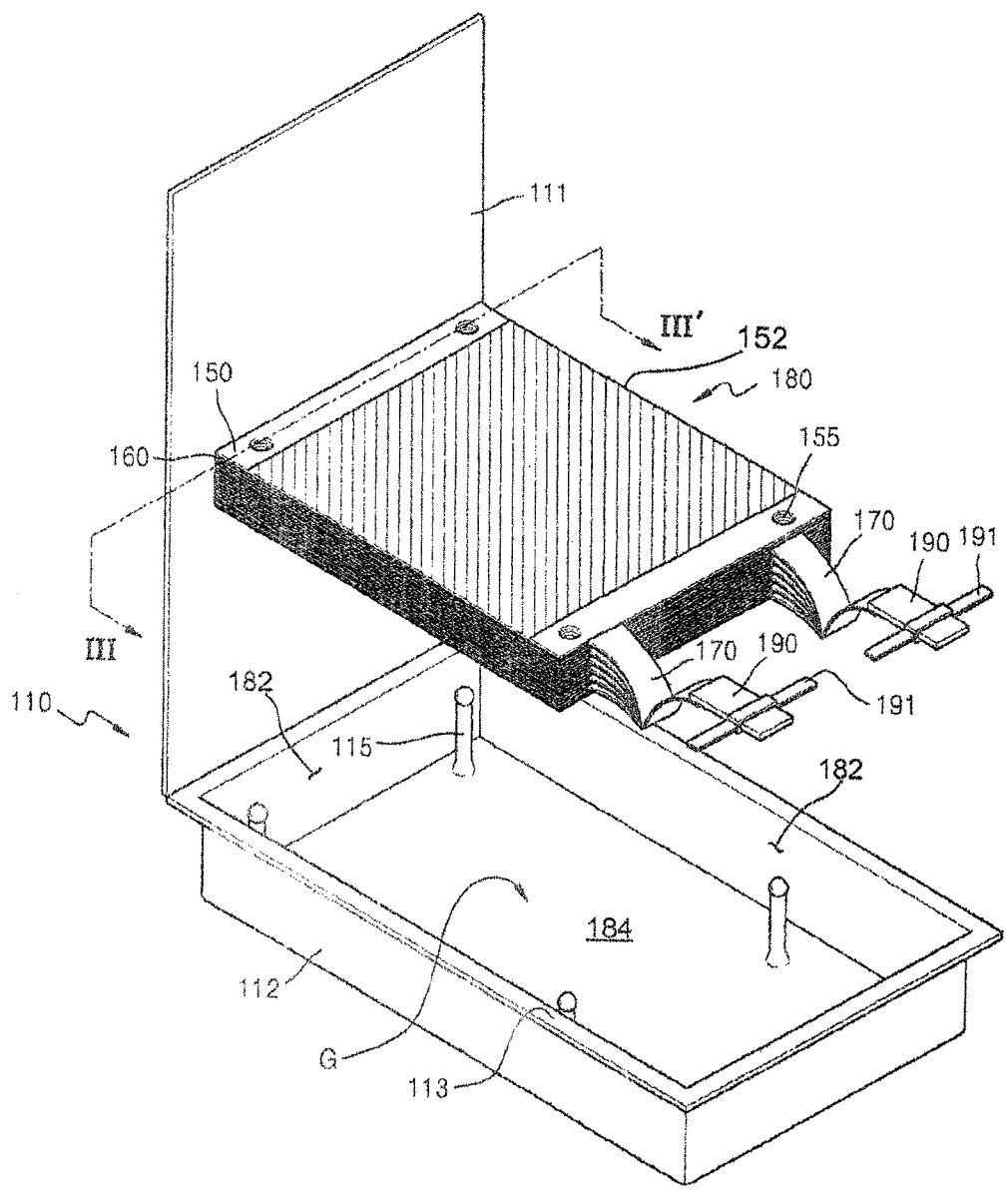
FIGS. 1 and 2 are exploded assembly views illustrating a battery constructed as an embodiment of the principles of the present invention.
Figure 2:
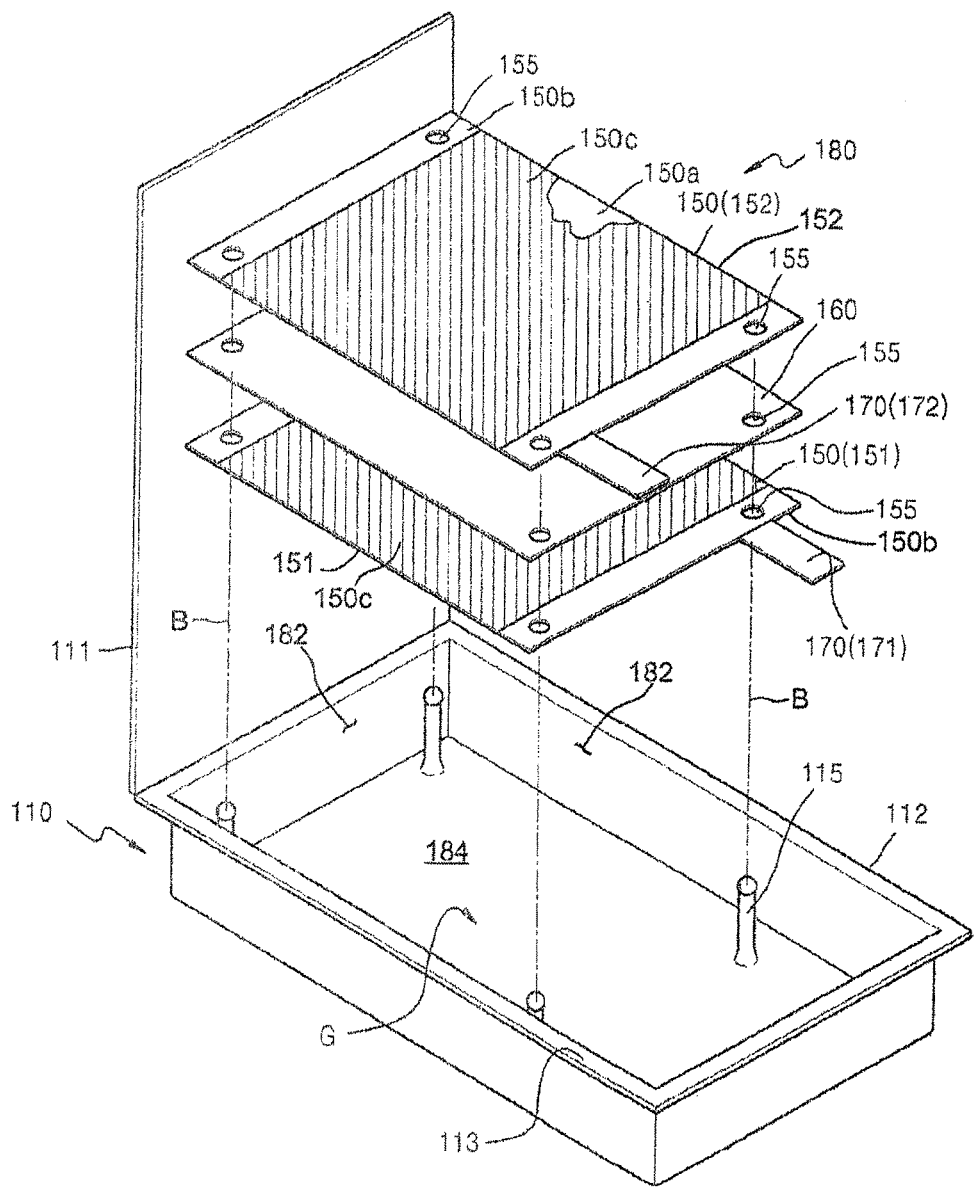

Hereinafter, battery packs fabricated as one or more embodiments of the principles of the present invention, will be described more fully with reference to the accompanying drawings. FIGS. 1 and 2 are exploded perspective views of a battery pack, fabricated as an embodiment of the present invention.

The battery pack includes an electrode assembly 180, electrode tabs 170 extending from the electrode assembly 180, lead members 190 electrically connected to the electrode tabs 170, and a battery case 110 accommodating the electrode assembly 180.

Referring to FIG. 2, the electrode assembly 180 is an electricity generating element in which a positive electrode element such as a positive electrode plate 151 and a negative electrode element such as a negative electrode plate 152 are sequentially stacked upon one another while a plate-shaped separator 160 is interposed between the plate-shaped positive electrode 151 and the plate-shaped negative electrode 152. The electrode assembly 180 may have a stack-type structure in which the positive plate 151, the separator 160, and the negative plate 152, each of which is cut to have a predetermined size, are sequentially stacked. In a resulting stack-type electrode assembly 180, when the number of electrode plates 150 being stacked, such as the positive plate 151 and the negative plate 152, are increased, the battery capacity be may easily increased. For example, in the electrode assembly 180, various numbers of positive plates 151 and negative plates 152 are stacked one upon another, or alternatively, the major surface areas of positive plates 151 and negative plates 152 may be increased, in order to increase the capacity of the battery. Hereinafter, positive plate 151 and negative plate 152 are comprehensively and collectively referred to as an electrode plate 150.

The electrode plate 150 may be formed by coating an active material onto and across a major surface of an electrode current collector 150a, and may include the electrode current collector 150a and an active material layer 150c formed on at least one surface of the electrode current collector 150a. For example, positive plate 151 includes a positive current collector (not shown) and a positive active material layer 150c formed across the width and length of at least one major surface of the positive current collector (not shown), and negative plate 152 includes a negative current collector and a negative active material layer formed on at least one major surface of the negative current collector 150a.

The active material non-coated portions 150b, that is, the terminating portions of the major surfaces of the electrode plates 151, 152 shown, are located along laterally opposite outer edges formed as the terminating edge margins of the major surface areas, and are not coated with a corresponding active material, may be formed on the terminating edge margins of each positive and each negative electrode plate 151, 152 of electrode plate 150. For example, positive non-coated portions 150b of positive electrode plate 151 may be formed as shown, as the terminating edge margins extending along both of a pair of laterally opposite terminal edges of positive electrode plate 151.

Negative non-coated portions 150b of positive electrode plate 151, that is, portions of the major surface shown that are located along laterally opposite outer edges of the major surface and that are not coated with the negative active material, may be formed as shown, as terminating edge margins along both of a pair of opposite edges of negative plate 152. By way of example, positive non-coated portions 150b may be formed along both laterally opposite edges of positive plate 151.

The electrode tabs 170 may be electrically connected to the non-coated portion 150b, and a positive tab 171 and a negative tab 172 may be electrically connected to the positive plate 151 and the negative plate 152, respectively, through the respective non-coated portions 150b. The term electrode tabs 170 is a general and collective term for both the positive tab 171 and the negative tab 172. For example, the electrode tabs 170 may be connected to the non-coated portion 150b by using a fastening technique such as either resistance welding, ultrasonic wave welding, or laser welding.

The electrode tabs 170 may be formed of a metal material having excellent electrical conductivity, and for example, the positive tab 171 may be formed of a metal material such as aluminum or nickel, and the negative tab 172 may be formed of a metal material such as copper or nickel. As illustrated in FIG. 1, the electrode tabs 170 are drawn out from each of the electrode plates 150 that are stacked one upon another, and overlap each other, and the electrode tabs 170 that are physically close to each other, are electrically connected to lead members 190. For example, the electrode tabs 170 may be connected to the lead members 190 by using ultrasonic welding. That is, a plurality of electrode tabs 170 extending from the electrode plates 150 are combined to each other and are connected to the lead members 190, for example, in the form of an integrally combined welding part by use of a fastening technique such as welding.

The battery case 110 provides an accommodation space G for receiving and thereafter accommodating electrode assembly 180, and insulates and protects the electrode assembly 180 from the exterior ambient environment. Battery case 110 may be constructed from a sheet material obtained by stacking a resin sheet onto both of the major surfaces of a metal film, and may include, for example, an aluminum stacked sheet, and then the sheet material may be deformed as, by way of example, stamp pressing, to form a continuum of a plurality of side walls 182 joined to a media base, or floor, 184.

The battery case 110 may include first and second cases 111 and 112 that form the accommodation space G which accommodatingly receives and retains the electrode assembly 180. The electrode assembly 180 is disposed between the first and second cases 111 and 112 so that the first case 111 and the second case 112 face each other, thereby sealing the electrode assembly 180. More specifically, the electrode assembly 180 may be sealed by heat welding of a combination surface 113 that faces the first case 111 and the second case 112, to thereby form a seal that joins first and second cases 111, 112.

When the first and second cases 111 and 112 are sealed together along combination surface 113, at least a portion of the lead members 190 may be exposed to the outside and, for example, the lead members 190 may be exposed to the outside through the gaps between the rim provided by combination surface 113 formed along the junction between the first and second cases 111 and 112. Here, the lead members 190 may be connected to and electrically insulated from the battery case 110, and electrical insulating film 191 may be used to ensure an electrically insulating state and to concomitantly increase the degree of sealing of battery case 110, may be attached to the electrical contact portions of lead members 190 and battery case 110.

An arrangement of guide portions 115 are formed in an array within the interior G of battery case 110. For example, the arrangement for guide portions 115 may be integrally formed on one side, such as the floor, or base 184, of the battery case 110.

The guide units 115 and the surrounding case 110 may be integrally created simultaneously together as a single monolithic unit, and thereby minimize construction costs and avoid unnecessary steps during fabrication of the battery.

The arrangement of guide portions 115 which provide the guide portion, or guide assembly, are created in juxtaposition to neighboring side walls 182, and are spaced slightly apart from side walls 182, in order to guide the position and placement of the positive plates 151, the separators 160, and the negative plates 152, which are stacked one upon another within accommodation space G during fabrication of the battery. The arrangement of guide portions 115 may be extended from base 184, in an upward and downward direction along a direction in which the positive electrode 151, separator 160 and negative electrode 152 are stacked seratim to form electrode assembly 180. In the one embodiment of the present invention, the arrangement of guide portions 115 may be projected upwardly from the bottom, or base, 184 of battery case 110 and may be formed as guiding pins integrally created simultaneously together with battery case 110 and its side walls 182 and base 184, with the proximal ends of guide portions 115 being coextensive with base 184, and with the distal ends of guide portions 115 each oriented to receive and mate with through voids 155 perforating laterally opposite terminal edge margins 150. During fabrication, electrode plate 150 and separator 160 are stacked one upon another so as to be penetrated by, and thereby mutually aligned with the arrangement of guide portions 115. Thus, electrode plate 150 and the separator 160 may be arranged without any of either positive electrode, 151, separator 160 or negative electrode 152 falling out of an aligned correspondence, or from becoming dislocated from a precise alignment with one another, or from shifting in that alignment during subsequent operational service.

Also, after the positions of electrode plate 150 and separator 160 have been fixed into a mutual alignment by the arrangement of guide portions 115, electrode plate 150 and separator 160 are not likely to be dislocated or to be shifted from their mutual alignment whenever the completed battery is subjected to an outside oscillation, impulse or shock of the magnitude typically experienced during mobile use. Thus, the battery, when fabricated as described here, is enabled to avoid an occurrence of an electric short that may otherwise occur between the positive plate 151 and the negative plate 152 due to the dislocation of the separator 160. Accordingly, battery stability may be increased and the alignment of the facing areas of the major surfaces of the positive plate 151 and the negative plate 152 to each other may be increased, thereby improving the capacity and efficiency of the battery during repeated cycles of charging and discharging of the battery.

In particular, as the arrangement of guide portions 115 are introduced in a high-capacity medium-to-large sized battery, the separator 160 may be prevented by the arrangement of guide portions 115 from sliding or twisting from a correctly aligned position established during the fabrication, both while the positive electrode 151, negative electrode 152 and separator 16 are being stacked on the arrangement of guide portions 115 and during operational use of the battery subsequent to fabrication due to long-time-of-use or to a change in the external environment in which the battery is used. Thus, operational stability of the battery may be significantly increased by the arrangement of guide portions 115. Also, an increase in internal resistance that may otherwise occur in a battery in the absence of the arrangement of guide portions 115, such as an increase in internal resistance due to generation of wrinkles in the separator 160, may be prevented by the presence of the arrangement of guide portions 115 to assure an initial establishment of a precise alignment during fabrication, and to assure that the maintenance of that alignment during operational use with the arrangement of guide portions 115. As the arrangement of guide portions 115 are introduced into the process of fabrication of the battery, the work required for the fabrication of electrode assembly 180 may be easily accomplished, with a greater precision in alignment of positive plate 151, negative plate 152, and separator 180, and thus, uniformity of successive production runs of batteries is heightened and the productivity in the process of manufacturing the battery packs may be improved, with a markedly lower number of substandard and rejected batteries. Concomitantly, the time for fabrication required per unit of battery, is reduced.

Figure 3:
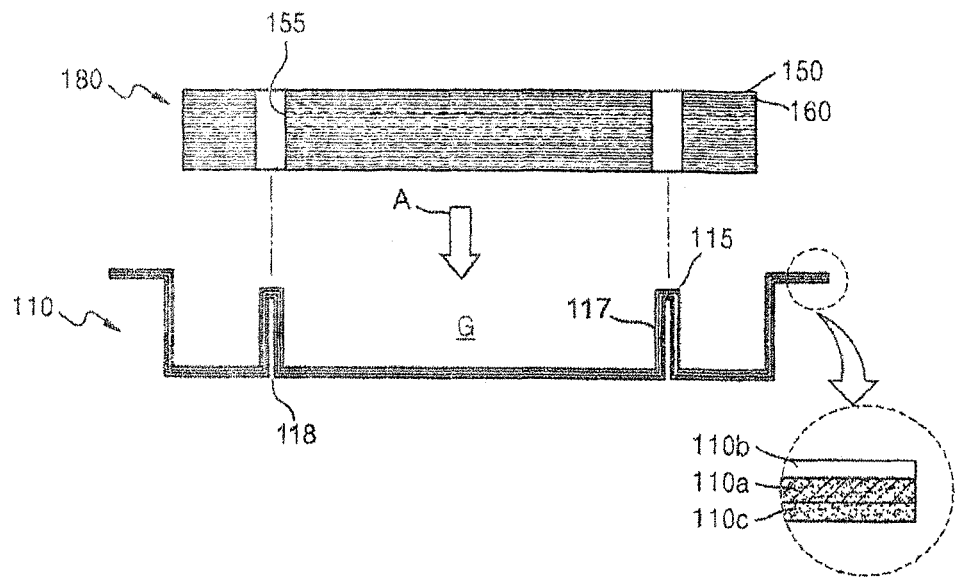
FIG. 3 is a cross-sectional view of the battery of FIG. 1 taken along sectional line III-III' of FIG. 1.

The arrangement of guide portions 115 are formed by posts having elongated sides 117 that extend substantially perpendicularly away from the base 184 of battery case 110 may have various forms, depending upon the fabrication processes used. FIG. 3 is a cross-sectional view of the battery pack taken from FIG. 1 cut along cross sectional-line III-III' of FIG. 1. Referring to FIG. 3, the arrangement of guide portions 115 may be formed by deformation, such as by stamp pressing a sheet of a material. Here, portions of the outer bottom, or underside, of battery case 110 are upwardly projected away from base 184 of battery case 110 at corresponding positions of the arrangement of guide portions 115, and the external bottom 118 opposite to the arrangement of guide portions 115 are hollow along the internal length of each guide portion 115.

The arrangement of guide portions 115 may be formed by selecting a sheet of material as a blank from which battery case 110 is to be formed, and by then performing a drawing process after applying a die (not illustrated) to that blank in order to simultaneously form side walls 182, base 184 and the arrangement of guide portions 115 provided by posts having elongated sides 117 that are formed to extend substantially perpendicularly away from base 184. The sheet material used to form the battery case 110 may include a stacked body in which electrically insulating films 110b and 110c are stacked on both surfaces of an electrically conducting, metal film 110a.

In another embodiment, the inner bottom of the arrangement of guide portions 115 may be upwardly projected to form the arrangement of guide portions 115, and the outer bottom 118 of the arrangement of guide portions 115 may be relatively flat, or alternatively, concavely open as shown in FIG. 3. For example, a one sheet of an electrically insulating material having the form of the arrangement of guide portions 115 may stacked upon another sheet of electrically conductive material so as to form the battery case 110.

The arrangement of guide portions 115 may be integrally formed with the battery case 110. Here, the arrangement of guide portions 115 may be formed from the same material as battery case 110, and may be formed of a sheet material in which the insulation films 110b and 110c are stacked to create both surfaces on the metal film 110a. Accordingly, although the positive plate 151 and the negative plate 152, each of which have different polarities, are fixed to penetrate the arrangement of guide portions 115, an electric short is unlikely to be generated because the arrangement of guide portions 115 having an electrical insulation characteristic provided by the presence of the outer surface of electrical insulating film 110b that is interposed between metal film 110a and all of the surfaces of positive electrode plate 152 and negative electrode plate 151 in proximity to through voids 155.

Two or more arrangement of guide portions 115 (that is, for example, in particular embodiments, two pairs of guide portions 115) may be constructed so as to prevent the electrode plate 150 and the separator 160 from rotating or from shifting relative to one another. As illustrated in FIG. 1, the arrangement of pairs of guide portions 115 may be formed in each of four corners of battery case 110. The position and number of the arrangement of guide portions 115 may be selected in order to assure the precise location, the arrangement and alignment between separators 160 and the plates forming electrode plate 150 that are stacked to form electrode assembly 180, and to assure a simplification and the convenience of the process for fabrication of the batteries.

As illustrated in FIG. 2, the arrangement of the corresponding through voids, such the through holes 155 shown, perforate corners of laterally opposite margins, or edges 150b, of each positive electrode 151, negative electrode 152 and separator 160, and are used to attain a continuity of alignment between separators 160 and successively stacked plates which form electrode plate 150 as received seriatim by guide portions 115 included in the electrode assembly 180. The position arrangement units, or through voids 155, may be formed as an assembly of through voids such as perforated assembly holes penetrating corresponding edges 150b of each positive electrode 151, negative electrode 152 and separator 160 in the direction of stacking of electrode assembly 180. The position and arrangement of through voids 155 may be formed to correspond to the positions of the arrangement of guide portions 115 formed in the battery case 110 and may be each formed, for example, in each of the four corners of the electrode plate 150.

More specifically, the position and arrangement of through voids such as through voids 155 may be formed on the non-coated portions, or edge margins, 150b which are not coated with an active electrode material. As the assembly holes 155 are not formed on the active material non-coated portions 150b, battery capacity is not affected. For example, four position and arrangement of through voids 155 may be formed to correspond to the non-coated portions 150b formed at the edge of the electrode plate 150.

The number of position and arrangement of through voids such as through voids 155, that are formed on, and through, each electrode plate 150 may be at least two in order to secure the position of each electrode plate 150 on a two-dimensional plane in order to thereby prevent electrode plate 150 from rotation relative to battery case 110 and to thereby maintain the correct and optimal position of each separator and electrode plate in relation to the other components of the battery. As illustrated in the drawings, a four position arrangement of through voids 155 may be formed on each of the positive electrode plate 151, negative electrode plate 152, and separator 160 forming each electrode plate 150 within electrode assembly 180. The position and arrangement of through voids 155 may be formed to have various cross-sectional shapes, including the circular shape shown in several of the drawings.

The through voids that serve as the position and arrangement of through voids 155 may be formed on the separator 160 included in the electrode assembly 180, and the location of separator 160 is thereby fixed relative to the arrangement of guide portions 115 through the cooperation between arrangement of guide portions 115 and position and arrangement of through voids 155.

The position and arrangement of through voids 155 may be formed as perforated assembly holes penetrating electrode plate 150 and each of positive electrode 151, negative 152 and separator 160 in a direction of stacking indicated by the arrow "A" along axis "B" of the electrode assembly 180. The position and arrangement of through voids 155 may be formed to correspond to the positions of the arrangement of guide portions 115 formed in the battery case 110 and may be each formed, for example, as shown by FIGS. 1 through 7, inclusive, located in each of the four corners of the separator 160. The number of positions and arrangements for placement of through voids 155 formed to perforate each separator 160 may be at least two in order to fix the position fixing on a two-dimensional plane, and thereby prevent separator 160 from being relatively rotated and to assure that separator 160 will maintain its correct position, both during fabrication and during subsequent cycles of charging and discharging during operational use. As illustrated in the drawings, four position arrangement of through voids 155 may be formed on each separator 160. The position and arrangement of through voids 155 may be formed to have various shapes, including a circular shape.

Figure 4:
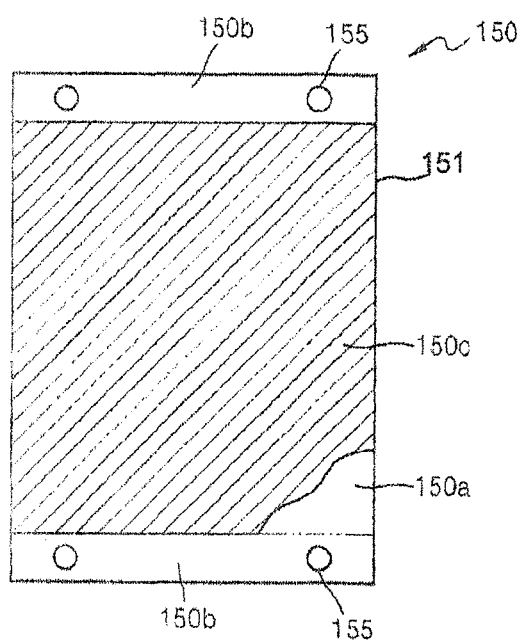
FIG. 4 is a plan view illustrating an electrode plate applicable to an embodiment of the present invention.

FIG. 4 illustrates the electrode plate 150 applicable to an embodiment of the present invention. Referring to FIG. 4, the position and arrangement of through voids 155 that perforate the edge margins 150b which terminate laterally opposite end of the major surface area of positive electrode plate 151, to which the arrangement of guide portions 115 of the battery case 110 are aligned, are included in the electrode plate 150. The position and arrangement of through voids 155 may be formed as perforated assembly holes penetrating through to align in correspondence to the positions and the arrangement of guiding portions 115. The position and arrangement of through voids 155 may be formed on the non-coated portions 150b of each of the electrode plates 150, for example; that is, to perforate the non-coated portions 150b at both edge margins of the electrode plate 150, and may be formed to be close to, and in juxtaposition to each of the corresponding four corners of electrode plate 150. As the position and arrangement of through voids 155 are formed on the non-coated portions 150b which do not bear a coating, or layer, of active material 150c that coats the majority of the major surface area of positive electrode plate 151 disposed between opposite terminating edge margins 150b, battery's capacity is not deleteriously affected by the presence of through voids 155. The position and arrangement of through voids 155 to perforate the electrode plate 150 may be conformable with the arrangement of guiding portions 115 formed in the battery case 110, for example, both with both through voids 155 and guiding portions 115 having a circular shape, and with the number and positions of through voids 155 corresponding to those for the arrangement of guiding portions 115.

Figure 5:
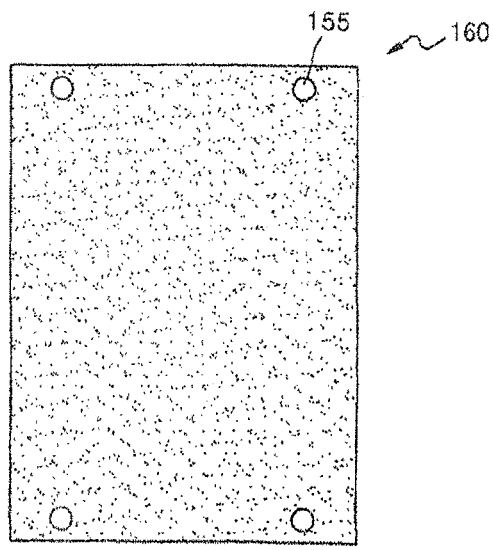
FIG. 5 is a plan view illustrating a separator applicable to an embodiment of the present invention.

FIG. 5 illustrates the separator 160 applicable to an embodiment of the present invention. Referring to FIG. 5, the position and arrangement through voids 155, to which the arrangement of guide portions 115 of the battery case 110 are fixed, are included in the separator 160. For example, the position and arrangement of through voids 155 may be formed to correspond to the positions of the arrangement of guide portions 115 along a direction of stacking of the electrode assembly 180, and may be formed to be close to four corners of the separator 160.

Figure 6:
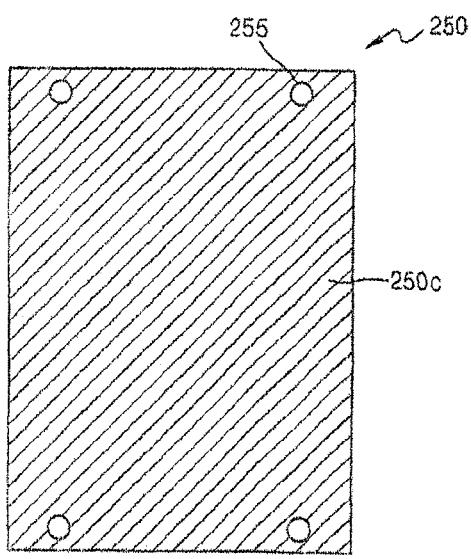
FIG. 6 is a plan view illustrating an electrode plate applicable to another embodiment of the present invention.

FIG. 6 illustrates an electrode plate 250 applicable to another embodiment of the present invention. Referring to FIG. 6, position and arrangement of through voids 255, to which the arrangement of guide portions 115 of the battery case 110 are fixed, are included in the electrode plate 250. The position and arrangement of through voids 255 are formed on an active material layer 250c on which an active material is coated. In order to increase battery capacity, an area of the active material layer 250c may be expanded and the position and arrangement of through voids 255 may be formed to penetrate the active material layer 250c. For example, the position and arrangement of through voids 255 may be formed to be close to four corners of the electrode plate 250.

Figure 7:
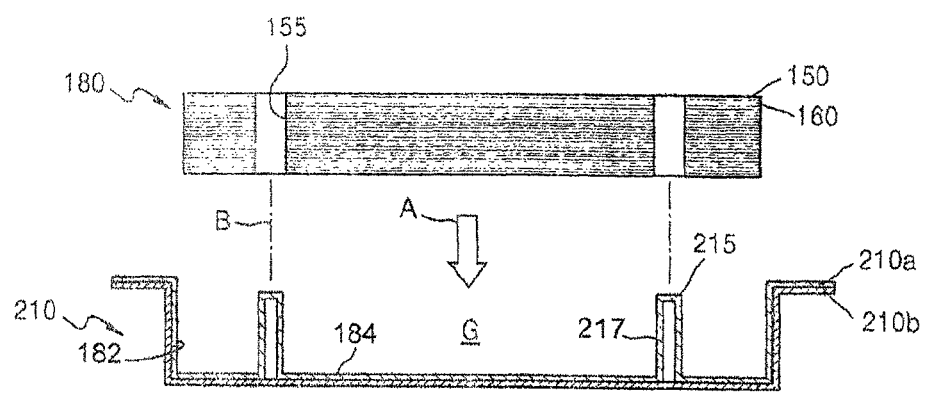
FIG. 7 is a cross-sectional view illustrating a battery pack constructed as another embodiment of the present invention.

FIG. 7 is a cross-sectional view of a battery pack, according to another embodiment of the present invention. Referring to FIG. 7, a battery case 210 includes the electrode assembly 180 as an electricity generating element and provides the accommodation space G for accommodating the electrode assembly 180. In FIG. 7, a portion of the battery case 210, which covers and seals the electrode assembly 180 accommodated in the battery case 210, is not illustrated.

The battery case 210 includes arrangement of guide portions 215 for arranging the positions of the electrode plate 150 and the separator 160 that are stacked upon one another. The arrangement of guide portions 215 may be extended along a direction of stacking indicated by the arrow "A" along axis "B" of the electrode assembly 180 and, for example, may be formed as pins projected upwardly from the bottom of the battery case 210.

Referring to FIG. 7, the battery case 210 may include a stack including a plurality of sheets, for example, a inner layer 210a constituting the inside of the battery case 210 and an outer layer 210b constituting the outside of the battery case 210. The inner and outer layers 210a and 210b are formed to define the accommodation space G which provides adequate volume to receive and to accommodating the electrode assembly 180, both during stacking of electrode plates 150 and during subsequent operational use of the completed battery.

The inner and outer layers 210a and 210b may each have different forms on the bottom of the battery case 210 including the arrangement of guide portions 215 that may be are formed by posts having elongated sides 217 that extend substantially perpendicularly away from the base 184. That is, the inner layer 210a may have a convex form to define the arrangement of guide portions 215 and the outer layer 210b may be continuously relatively flat all along the underside of battery case 210. The battery case 210 may be formed by stacking the inner layer 210b having a projected form of the arrangement of guide portions 215 on the outer layer 210b.

The inner layer 210a may include a plastic deformable material capable of maintaining its shape after formation processing of the arrangement of guide portions 215 and may be formed of, for example, an electrically conducting metal material including an insulation coating layer. The outer layer 210b may include a material having an insulation property and may be formed of, for example, a metal material including an electrical insulation coating layer. With this style of construction, both the interior of side wall 182 within accommodation space G, and the base, or floor 184 of accommodation space G are sheathed with an electrically insulating layer, or first layer, 210a, and do not form an electrically conducting circuit with electrode assembly 180.

Figure 8:
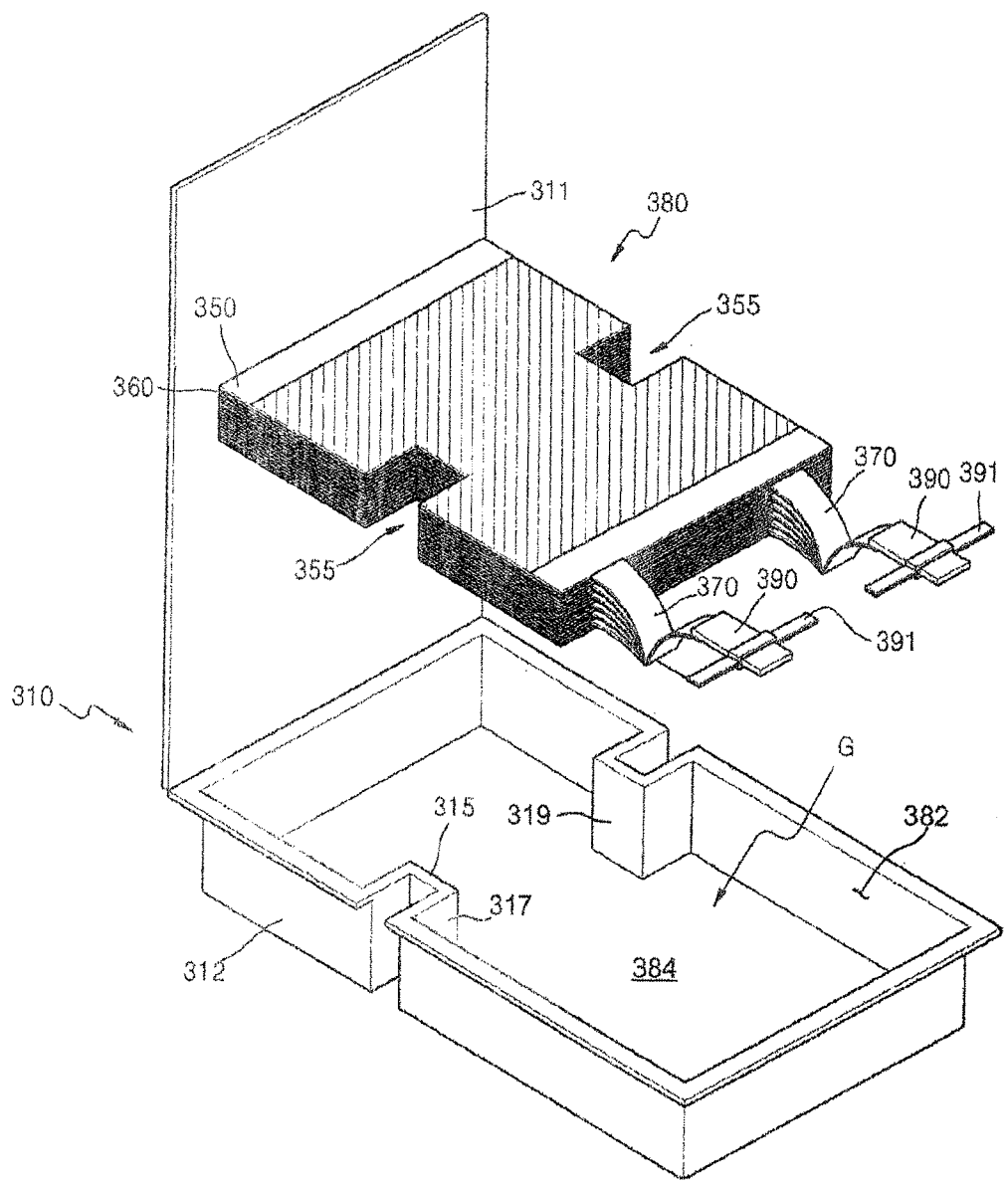
FIGS. 8 and 9 are exploded perspective views illustrating a battery constructed as another embodiment of the present invention.
Figure 9:
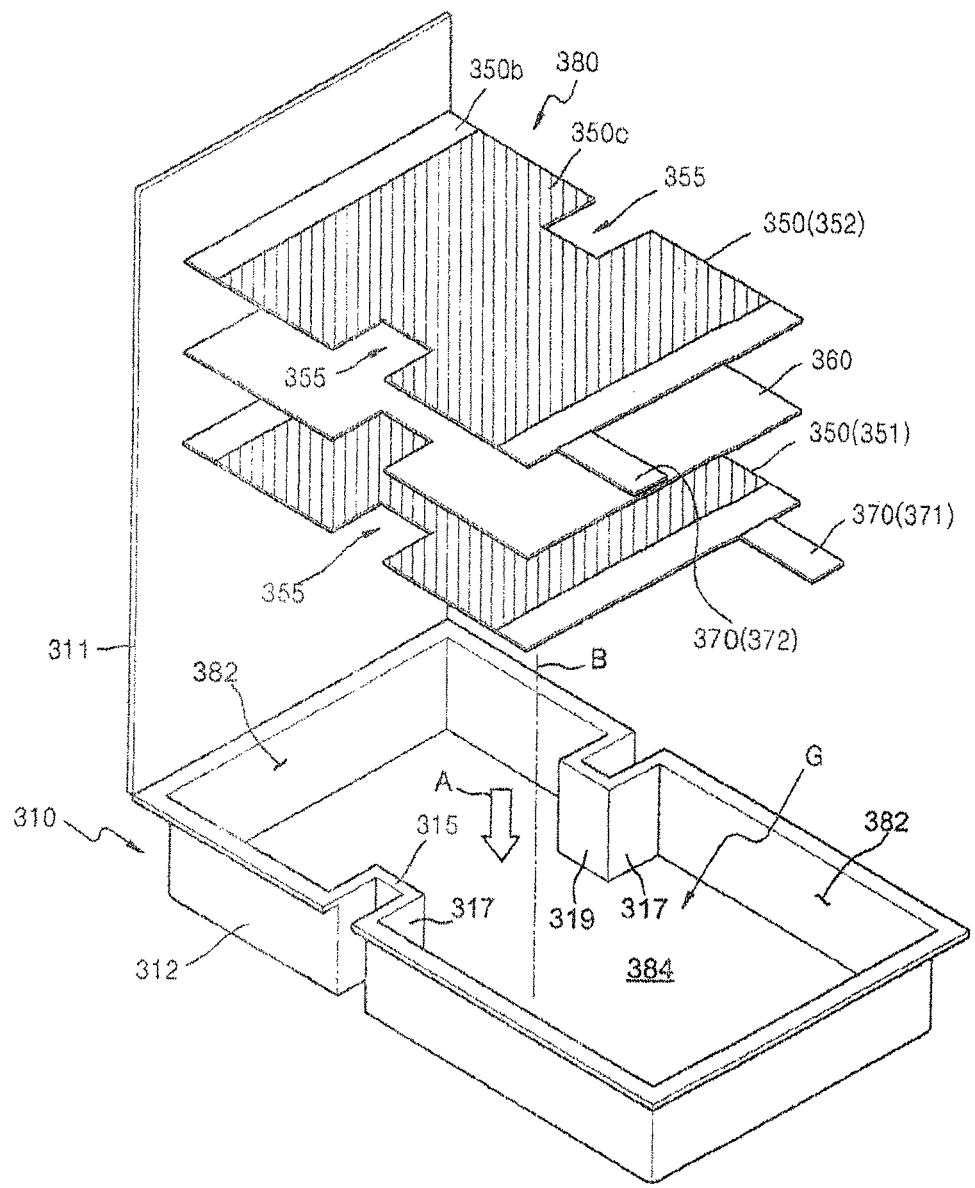

FIGS. 8 and 9 are exploded assembly views of a battery pack, according to another embodiment of the present invention. Referring to FIGS. 8 and 9, the battery pack includes a battery case 310, in which arrangement of guide portions 315 are formed, and an electrode assembly 380 accommodated in the battery case 310 as a stack of electrode plates 350 and a separator 360 stacked upon one another by being guided by the arrangement of guide portions 315.

Guide portions, or portions 315 are integrally formed with the battery case 310. For example, the arrangement and position of guiding portions 315 may have a convex form projected inward from the side of the battery case 310. The positions and arrangements of through voids 355 that perforate the electrode plates 350 and the separator 360 conform in cross-sectional shape and conform to and align with the arrangement, positions and alignment of guide portion 315 and thus the positions of the electrode plates 350 and the separator 360 that are stacked one upon the another, may be arranged.

The battery case 310 may include first and second cases 311 and 312 that are combined with each other in a direction facing each other to seal the accommodation space G accommodating the electrode assembly 380, and the arrangement of guide portions 315 may be formed in the second case 312. The present invention is not limited thereto and the arrangement of guide portions 315 may be formed in the first case 311 or in both the first case 311 and the second case 312.

For example, the arrangement of guide portions 315 may be formed on both sides of the battery case 310 and may be projected inward in parallel from both sides that face each other. The arrangement of guide portions 315 may have any form so long as the electrode plates 350 and the separator 360 may be relatively arranged with a consistent alignment. This assures that the capacity and operational performance of the completed battery will not become degraded by lateral shifting of the separator relative to the electrode plates, either during fabrication or during cycles of charging and discharging.

For example, the arrangement of guide portions 315 may be projected in a square column form having aspects formed by pairs of side walls 317 each joined by side wall 319, in pairs, extending from bottom, or floor, 384. The arrangement of guide portions 315 may be formed by pressing a raw material sheet of the battery case 310 or by performing a drawing process of a raw material sheet with applying a mold (not illustrated) by which the arrangement of guide portions 315 are defined. For example, the side of the battery case 310 is projected inward according to a pressure from a mold (not illustrated) during a formation process and thus the arrangement of guide portions 315 as illustrated in FIGS. 8 and 9 may be formed.

Implementation of the principles of the present invention is not limited to the foregoing exemplars, and the inner side of the battery case 310 may be projected inward so as to form the arrangement of guide portions 315 and the outer side of the battery case 310 may be relatively flat. Such a battery case 310 may be formed by stacking a sheet having the form of arrangement of guide portions 315 upon another sheet.

As illustrated in FIG. 9, the position and arrangement of through voids 355 may be prepared in the electrode plates 350 included in the electrode assembly 380 so that the arrangement of guide portions 315 constructed with aspects formed by pairs of side walls 317 each joined by and intermediate, connecting side wall 319, fixed thereto. For example, the position and arrangement of through voids 355 may be formed as openings perforated in a direction of stacking of the electrode assembly 380 on both edges of the electrode plates 350, wherein the openings are opened toward the outside.

The position and arrangement of through voids 355 may be conformable with the arrangement of guide portions 315 and may be formed, for example, in a square form in which one side thereof is opened. Three sides of the position and arrangement of through voids 355, except for the opened side, closely contact the arrangement of pairs of side walls 317 and the intermediate, joining side wall 319 that form guide portions 315, and thereby accurately and reliably maintain the correct positions of electrode plates 350.

The position and arrangement of through voids 355 may be formed as a pair at edges that are opposite to each other. The position and number of the position and arrangement of through voids 355 may be adjusted in consideration of an allowable arrangement error and process convenience. For example, when the electrode plates 350 are formed in a rectangle having long sides and short sides, the position and arrangement of through voids 355 may be formed at long-sided portions of the electrode plate 350; however, the position and arrangement of through voids 355 may be formed at short-sided portions of the electrode plate 350.

Each electrode plate 350 including a positive plate 351 and a negative plate 352 may include an active material layer 350c, on which an active material is coated, and a non-coated portion 350b, on which an active material is not coated. For example, the non-coated portion 350b may be formed at the short-sided portions of the electrode plate 350 and the position and arrangement of through voids 355 may be formed at the long-sided portions of the electrode plate 350, that is, on the active material layer 350c. However, the present invention is not limited thereto and the position and arrangement of through voids 355 may be formed on the non-coated portion 350b, on which an active material is not coated.

Electrode tabs 370 for inducing a current generated from the electrode plate 350 may be drawn out from the non-coated portions 350b of each electrode plate 350. That is, a positive tab 371 and a negative tab 372 may be electrically connected to the non-coated portions 350b of the positive plate 351 and the negative plate 352.

As illustrated in FIG. 8, the electrode tabs 370 drawn out from each of the electrode plates 350 overlap each other, and the electrode tabs 170 that are close to each other are electrically connected to lead members 390. For example, the electrode tabs 370 may be connected to the lead members 390 by using ultrasonic welding. At least a portion of the lead members 390 may be exposed to the outside through the gaps between the first case 311 and the second case 312. Insulation films 391 used to increase the sealing degree and to ensure an insulation property may be attached to contact portions of the lead members 390 and the first and second cases 311 and 312.

Figure 10:
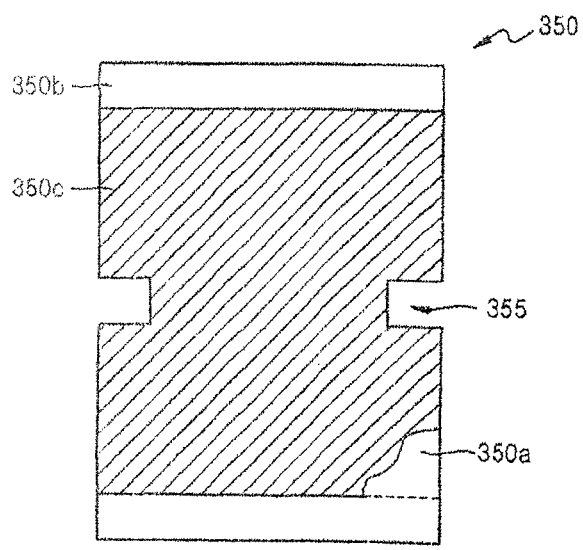
FIG. 10 illustrates an electrode plate applicable to another embodiment of the present invention.

FIG. 10 illustrates the electrode plate 350 applicable to another embodiment of the present invention. Referring to FIG. 10, the electrode plate 350 may be formed by coating an active material on a surface of an electrode current collector 350a and, may include the electrode current collector 350a and an active material layer 350c formed on at least one surface of the electrode current collector 350a. The non-coated portions 350b, on which the active material layer 350c is not formed, may be formed at the edge of the electrode plate 350. The position and arrangement of through voids 355 may be prepared in the electrode plate 350 so that the arrangement of guide portions 315 of the battery case 310 are fixed to the position and arrangement of through voids 355. For example, the position and arrangement of through voids 355 may be formed as openings on the edges of the electrode plate 350 that face each other, wherein the openings are opened toward the outside. The position and arrangement of through voids 355 may be conformable with the arrangement of guide portions 315 and may be formed, for example, in a square form in which one side thereof is opened. The position and arrangement of through voids 355 may be formed on the active material layer 350c of the electrode plate 350, on which an active material is coated, and may be formed on the long-sided portions of the electrode plate 350.

Figure 11:
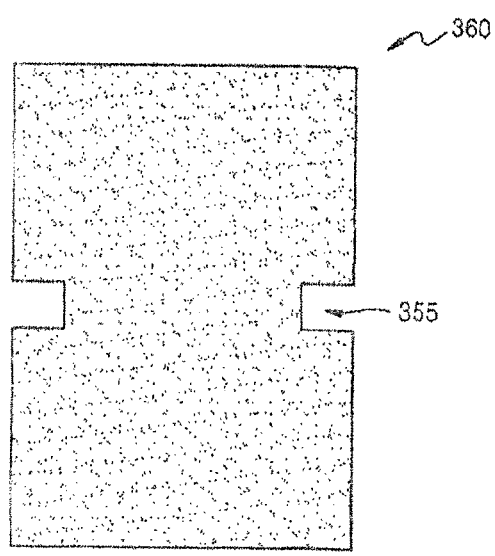
FIG. 11 is a plan view illustrating a separator applicable to another embodiment of the present invention.

FIG. 11 illustrates the separator 360 applicable to an embodiment of the present invention. Referring to FIG. 11, the position and arrangement of through voids 355 may be prepared in the separator 360 so that the arrangement of guide portions 315 of the battery case 310 are fixed to the position and arrangement of through voids 355. The form and position of the position and arrangement of through voids 355 may correspond to those of the arrangement of guide portions 315. For example, the position and arrangement of through voids 355 may be formed as openings on the edges of the electrode plate 350 that face each other, wherein the openings are opened toward the outside. More specifically, the position and arrangement of through voids 355 may be formed in a square form in which one side thereof is opened. The position and arrangement of through voids 355 may have any form as long as the position and arrangement of through voids 355 are aligned and conformable with the arrangement of guide portions 315 and closely contact the arrangement of guide portions 315 so that the separator 360 is correctly positioned.

Figure 12:
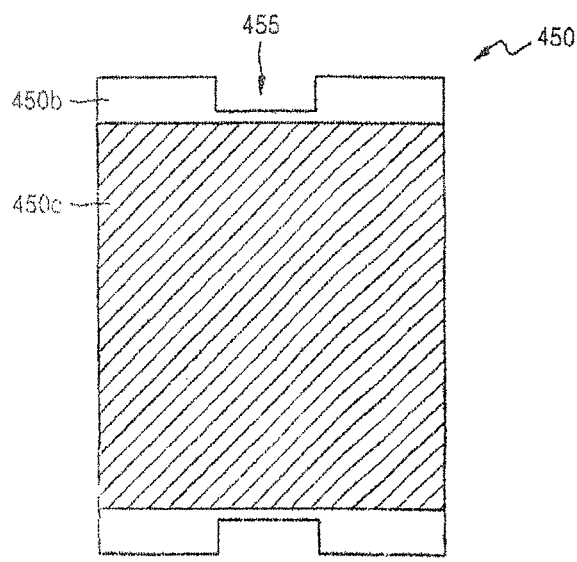
FIG. 12 is a plan view illustrating an electrode plate applicable to another embodiment of the present invention.

FIG. 12 illustrates an electrode plate 450 applicable to another embodiment of the present invention. Referring to FIG. 12, the electrode plate 450 includes an active material layer 450c, on which an active material is coated, and non-coated portions 450b, on which an active material is not coated. For example, the non-coated portions 450b may be formed at both edges of the electrode plate 450. Position and arrangement of through voids 455 may be prepared in the electrode plate 450 so that the arrangement of guide portions 315 of the battery case 310 are fixed to the position and arrangement of through voids 455. The position and arrangement of through voids 455 may be formed on the non-coated portions 450b of the electrode plate 450. For example, the position and arrangement of through voids 455 may be formed on the non-coated portions 450b at both edges of the electrode plate 450, and may be conformable with the arrangement of guide portions 315, for example, in a square form in which one side thereof is opened. As described above, as the position and arrangement of through voids 455 are formed on the non-coated portions 450b, on which an active material is not coated, the position and arrangement of through voids 455 may be formed without affecting battery capacity.

Figure 19:
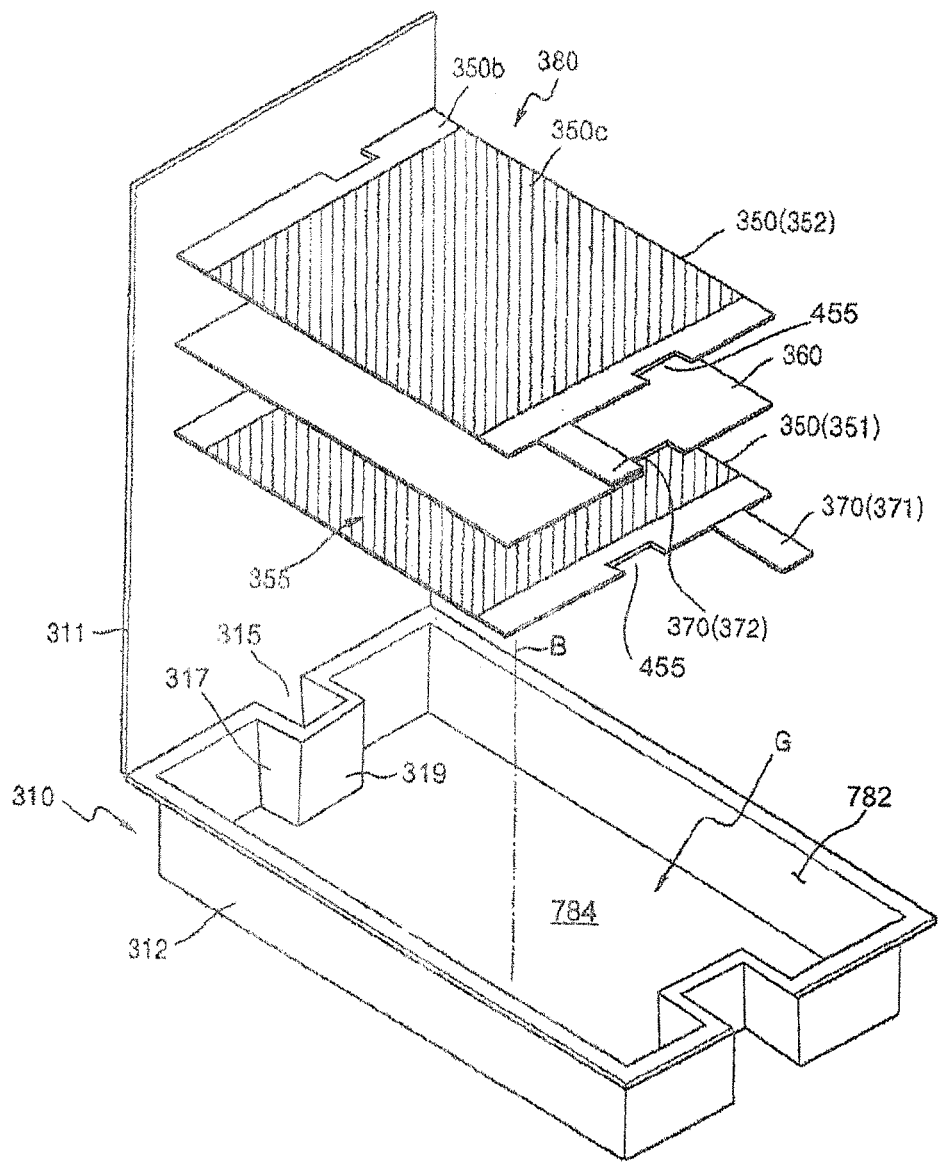
FIG. 19 is an exploded assembly view illustrating a battery, constructed as an embodiment of the present invention.

FIG. 19 is an exploded perspective view illustrating a battery, constructed to accommodate electrode plate 350 illustrated by FIG. 12. The placement, position, orientation and arrangement of through voids 455 may be formed as openings on the edges of the electrode plate 350 that face each other, wherein the openings are opened toward the outside. More specifically, the position and arrangement of through voids 355 may be formed with a square cross-sectional shape in which one side thereof is open. The position and arrangement of through voids 355 may have any form as long as the position and arrangement of through voids 355 are aligned and conformable with the arrangement of guide portions 315 fabricated with pairs of side walls 317 each joined by intermediate, connecting side wall 319, and closely contact the pairs of side walls 317 and the intermediate side wall 319 of the arrangement of guide portions 315, so that each separator 360 is correctly positioned and held in an alignment conforming with the positive and negative electrode plates.

Guide portions 315 have aspects formed by pairs of side walls 317 each joined by side wall 319, in pairs on laterally opposite ends of base 784 of accommodate space G, each in juxtaposition to a corresponding one of laterally opposite side walls 315 of case 310 neighboring the pairs of guide portions 315, and have cross-sectional shapes that conform to corresponding discrete through voids 455 that perforate each of laterally opposite edge margins 350b of each of the positive electrode, negative electrode and interposed separator to be stacked within case 310, and extend substantially perpendicularly from base 784 of case 310, with a majority of surface area of base 784 located in between the opposite pairs of the aspects of the guide portions 315.

The guide portions 315 and case 310 are integrally created simultaneously together as a monolithic unit. Electrode assembly 380 is formed as the positive electrode plate, negative electrode plate and separator are disposed between the positive electrode plate and the negative electrode plate, each of the positive electrode plate, the negative electrode plate and the separator have a majority of a major surface area interposed between opposite terminating edges 350b that are both perforated outside of the majority by a plurality of discrete and corresponding through voids at locations within the edges 350b aligned by the guide portion during stacking of the positive electrode, the negative electrode and the separator within the case. Consequently, through voids 455 do not diminish the active material layers 350c borne by the positive and negative electrode plates, thus ensuring a battery with greater energy density.

Figure 12A:
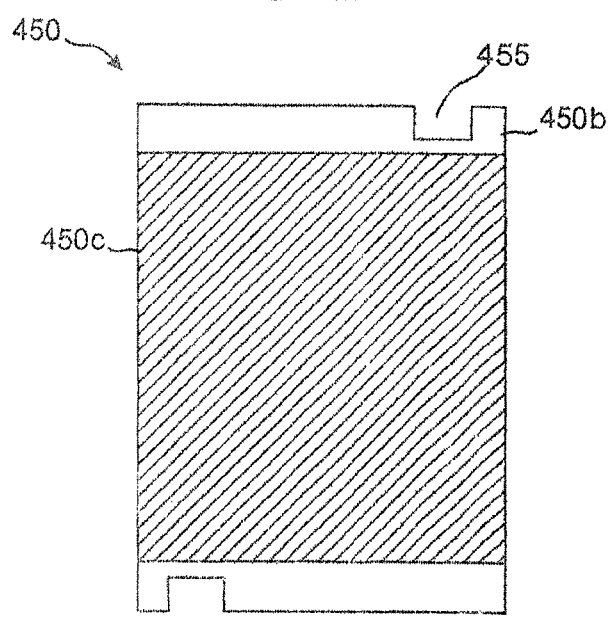
Figure 12B:
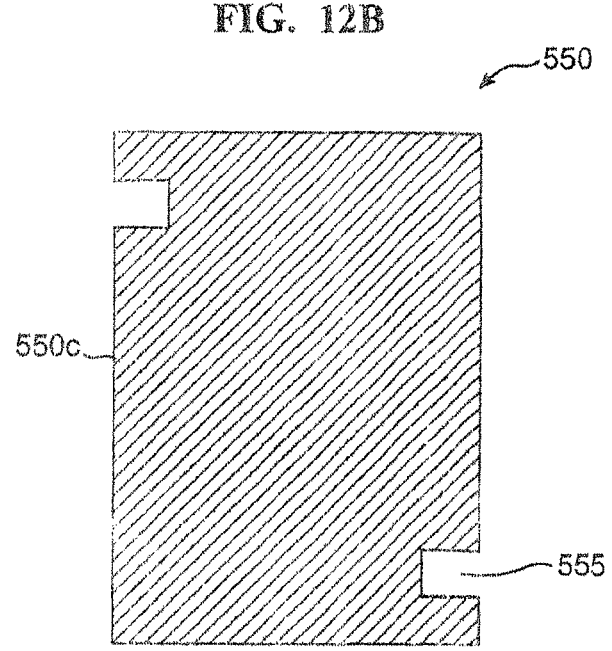

FIGS. 12A and 12B are a plan views illustrating alternative aspects of an electrode plate fabricated in conformance with the principles of this invention. The placement, position, orientation and arrangement of through voids 455, 555 may be formed as openings on the edges of the electrode plates 450, 550, wherein the openings are opened toward the outside and away from the majority of the major surface area of electrode plates 450, 550 that bears a layer 450c, 550c of active electrode material. More specifically, the position and arrangement of through voids 455, 555 may be formed with a square cross-sectional shape in which one side thereof is open. The position and arrangement of through voids 455, 555 may have any form as long as the position and arrangement of through voids 355 are aligned and conformable with the arrangement of guide portions 315 and closely contact the arrangement of guide portions 315 so that each separator is correctly positioned and held in an alignment conforming with the positive and negative electrode plates.

Figure 13:
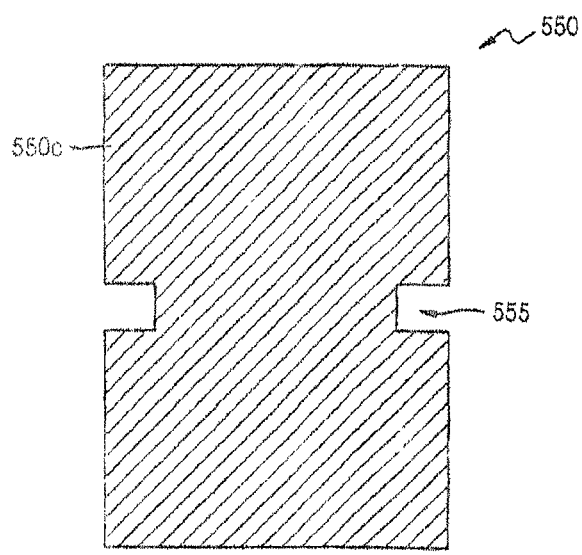
FIG. 13 is a plan view illustrating an electrode plate applicable to another embodiment of the present invention.

FIG. 13 is an exploded perspective view illustrating a battery, constructed as an embodiment of the present invention.

FIG. 13 illustrates an electrode plate 550 applicable to another embodiment of the present invention. Referring to FIG. 13, position and arrangement of through voids 555 may be prepared in the electrode plate 550 so that the arrangement of guide portions 315 of the battery case 310 are fixed to the position and arrangement of through voids 555. The position and arrangement of through voids 555 may be formed on the long-sided portions of the electrode plate 550, for example, an active material layer 555, on which an active material is coated.

The position and arrangement of through voids 555 may be formed as pairs at edge margins that are laterally and directly opposite to each other, and which terminate the majority of the major surface area of each positive and negative electrode plate bearing layer of active electrode material. The position and number of the position and arrangement of through voids 555 may be adjusted in consideration of an allowable arrangement error and convenience of process. For example, the position and arrangement of through voids 555 may be formed at the long-sided portions of the electrode plate 550; however, the position and arrangement of through voids 555 may be formed at the short-sided portions of the electrode plate 550. In the electrode plate 550 according to the current embodiment of the present invention, an area of the active material layer 550c, on which an active material is coated, may be expanded so as to increase battery capacity, and the position and arrangement of through voids 555 may be formed to penetrate the active material layer 550c.

Figure 14:
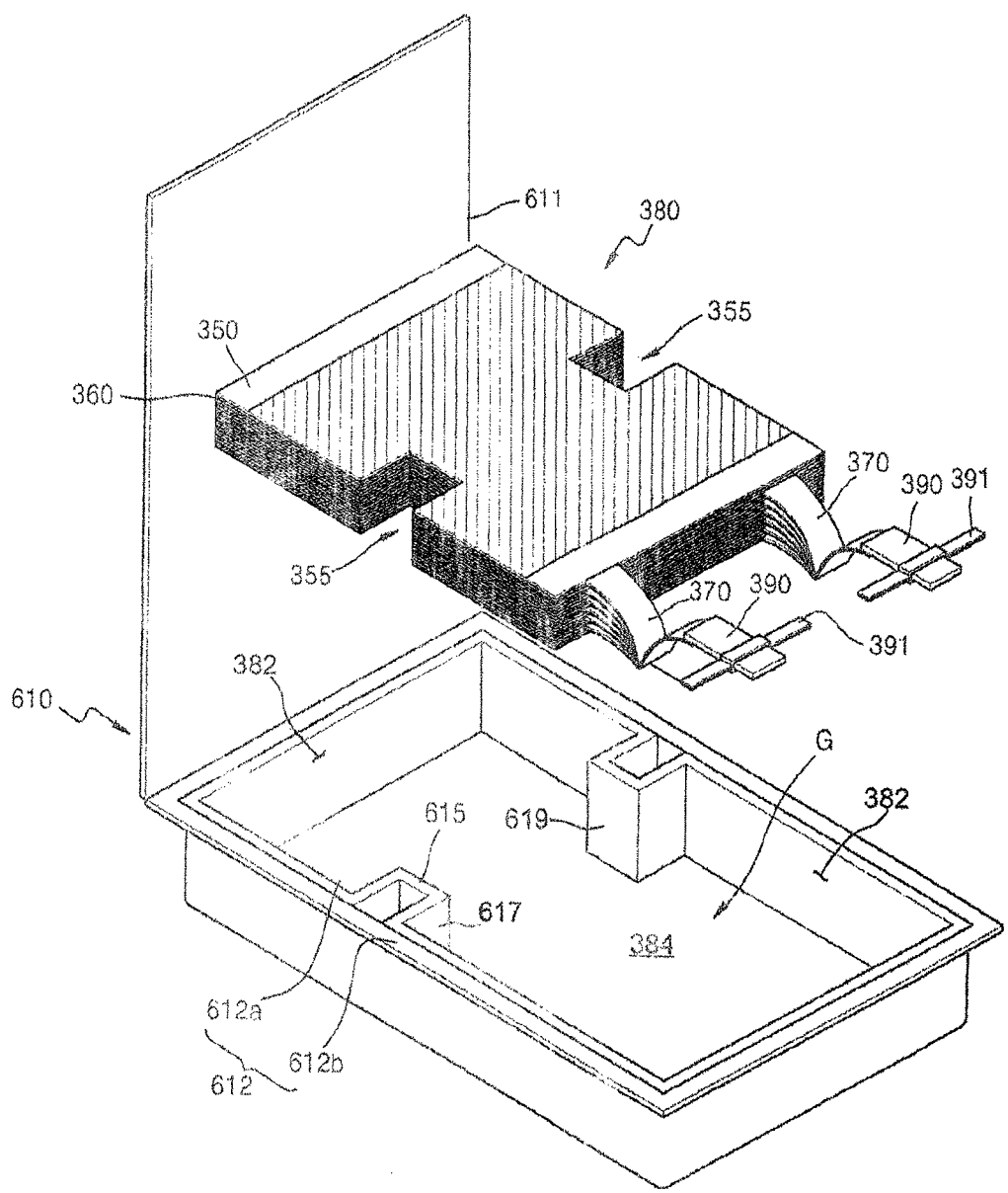
FIG. 14 is an exploded assembly view illustrating a battery, constructed as another embodiment of the present invention.

FIG. 14 is an exploded perspective view of a battery pack, according to another embodiment of the present invention. Referring to FIG. 14, the battery pack includes the electrode assembly 380 as an electricity generating element and a battery case 610 that provides the accommodation space G for accommodating the electrode assembly 380.

Arrangement of guide portions 615 are formed in the battery case 610 by pairs of side walls 617 each joined together by an intermediate, connecting side wall 619. The arrangement of guide portions 615 guide assembling positions of the various numbers of the electrode plates 350 and the separator 360, which are stacked upon one another, and may be extended in an upward and download direction along a direction of stacking of the electrode assembly 380. The arrangement of guide portions 615 may have a convex form projected inward from the side of the battery case 610.

The battery case 610 may include first and second cases 611 and 612 that are combined with each other in a direction facing each other to seal the accommodation space G accommodating the electrode assembly 380, and the arrangement of guide portions 615 may be formed in the second case 612. The principles of the present invention are not limited to the particular exemplars of those embodiments described in the foregoing paragraphs, and the arrangement of guide portions 615 may be formed in the first case 611 or both the first case 611 and the second case 612.

The second case 612 including the arrangement of guide portions 615 may include a stack including a plurality of sheets, for example, a inner layer 612a constituting the inside of the battery case 610 and a outer layer 612b constituting the outside of the battery case 610. The inner and outer layers 612a and 612b may have the form of box to define the accommodation space G for accommodating the electrode assembly 380.

The inner and outer layers 612a and 612b may each have different forms at the side of the battery case 610 including the arrangement of guide portions 615. That is, the inner layer 612a has a convex form to define the arrangement of guide portions 615 and the outer layer 612b may be relatively flat. The battery case 610 may be formed by inserting the inner layer 612a having a projected form of the arrangement of guide portions 615 into the outer layer 612b.

The inner layer 612a may include a plastic deformable material capable of maintaining the shape after formation processing of the arrangement of guide portions 615 and may be formed of, for example, a metal material including an insulation coating layer. The outer layer 612b may include an insulation material and may be formed of, for example, a metal material including an insulation coating layer.

The position and arrangement of through voids 355 may be disposed to correspond to the electrode plates 350 and the separator 360 which are inserted through the arrangement of guide portions 615. The position and arrangement of through voids 355 may be conformable with the arrangement of guide portions 615. The position and arrangement of through voids 355 may be formed as openings on both edges of the electrode plates 350 and the separator 360, wherein the openings are opened toward the outside.

For example, the position and arrangement of through voids 355 may be formed with a square cross-sectional form, in which one side thereof is opened. Three sides of the position and arrangement of through voids 355, except for the opened side, closely contact the arrangement of guide portions 615 and thus the electrode plates 350 may maintain their correct alignment, positions and orientation with one another throughout electrode assembly 380, both during fabrication and during subsequent cycles of charging and discharging.

Figure 15:
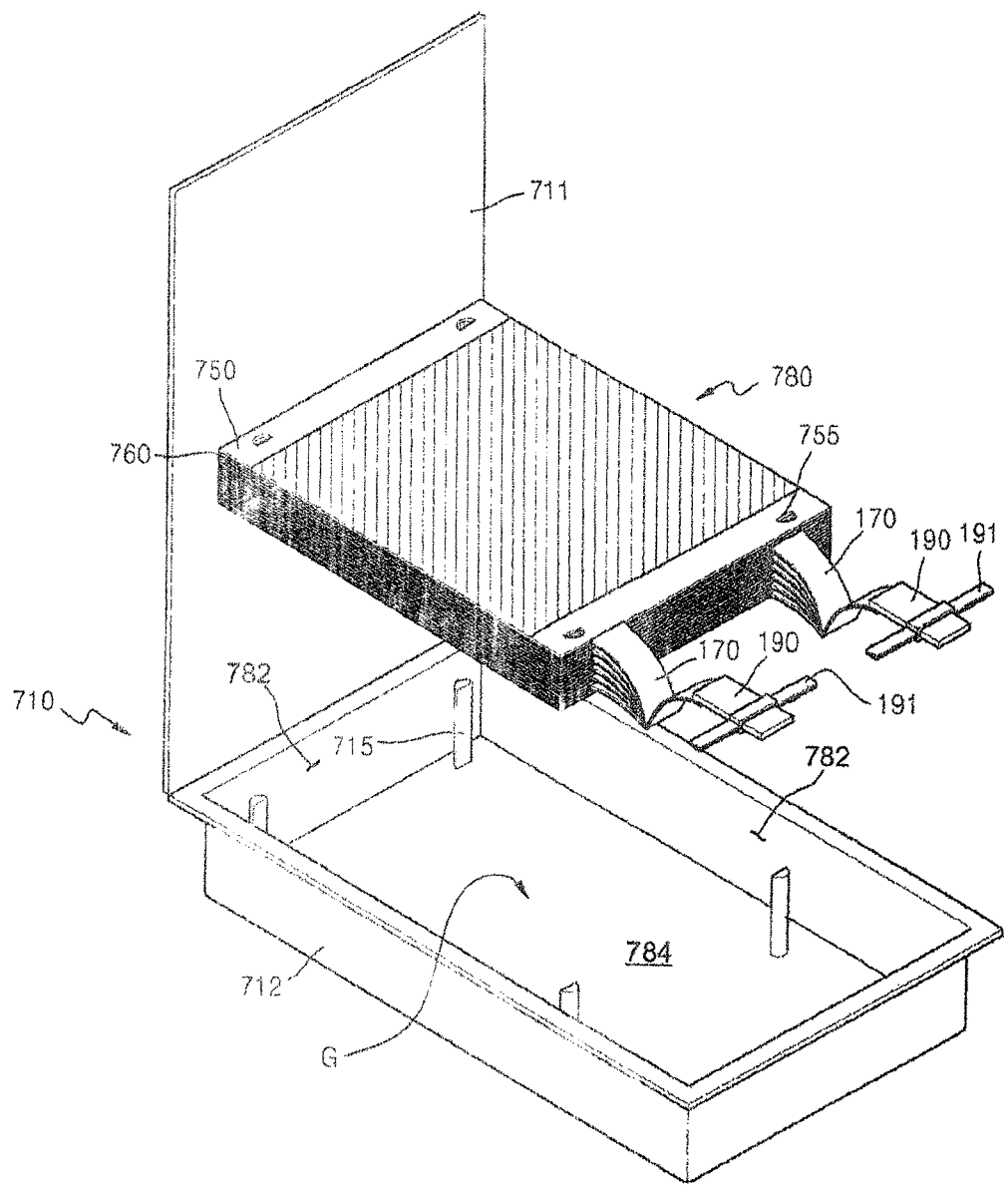
FIGS. 15 and 16 are exploded assembly views illustrating a battery, constructed as an embodiment of the present invention.
Figure 16:
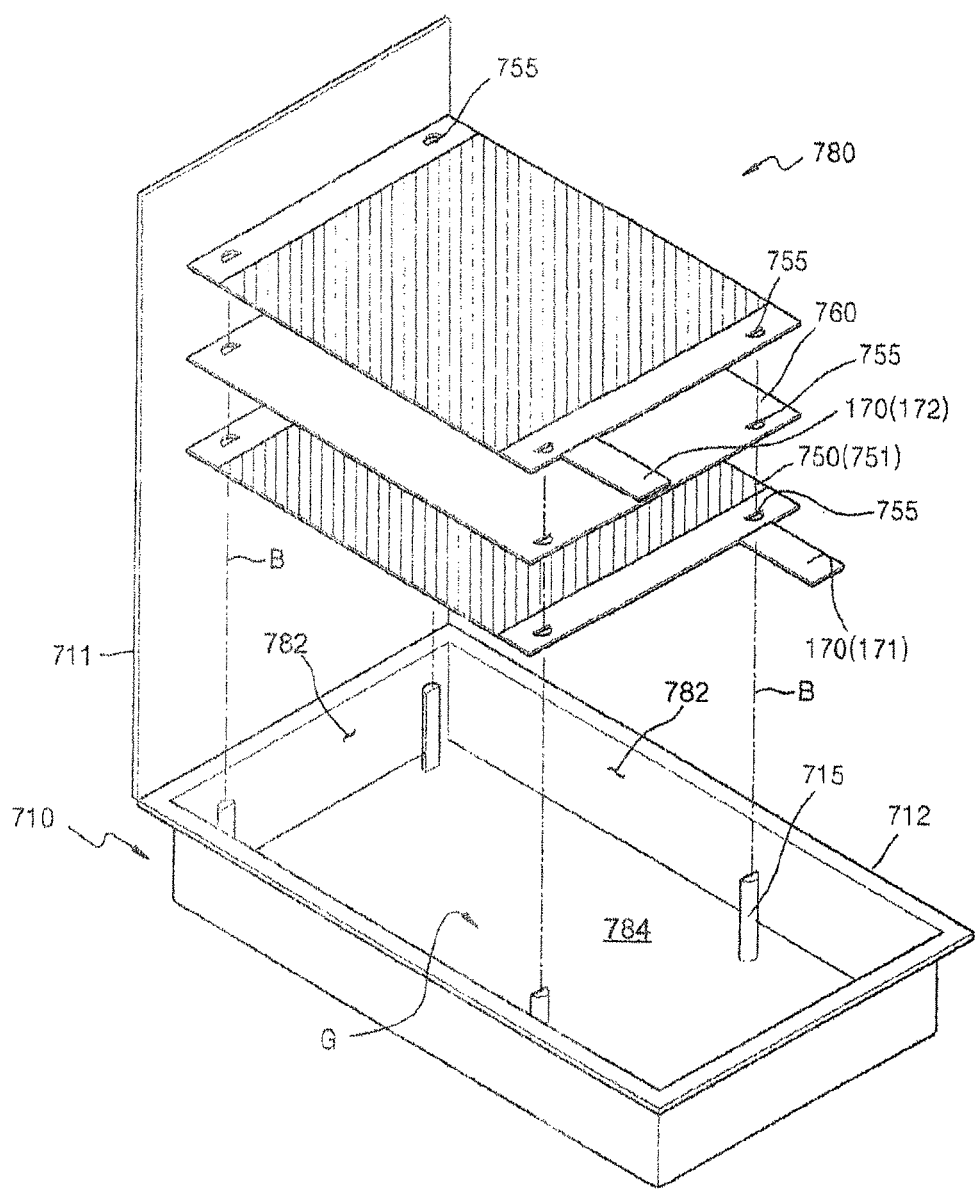
Figure 17:
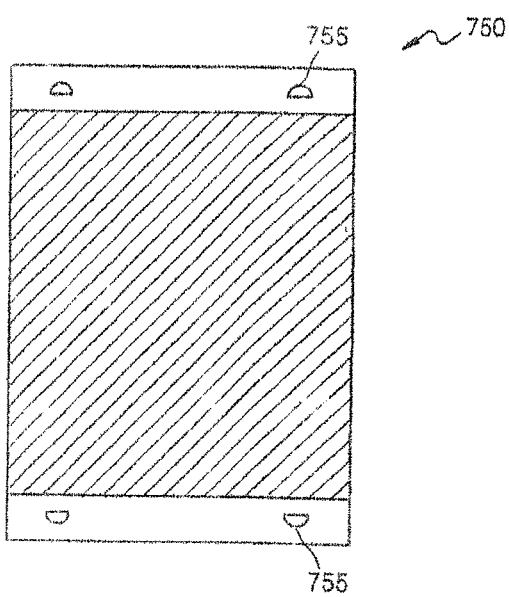
FIG. 17 is a plan view illustrating an electrode plate taken from FIG. 16.

FIGS. 15 and 16 are exploded perspective views of a battery pack, fabricated as an exemplary embodiment of the principles of the present invention. FIG. 17 illustrates an electrode plate 750 of FIG. 16.

Referring to FIGS. 15 through 17, the battery pack includes an electrode assembly 780 formed by sequentially stacking an electrode plate 750 and a separator 760, and a battery case 710 that provides the accommodation space G for accommodating the electrode assembly 780. The battery case 710 may be fabricated in a substantially rectilinear geometrical shape with a pair of longer side walls 782 joined together by intermediate, shorter connecting side walls 782, with side walls extending upwardly from a base substrate, or floor 784 of battery case 710. Battery case 710 includes first and second sectional components 711, 712 that face and are combined with each other and the electrode assembly 780 is disposed therebetween.

Arrangement of guide portions 715, to which the electrode assembly 780 is fixed, are formed in the battery case 710. The arrangement of guide portions 715 may be formed in a direction of stacking of the electrode assembly 780, that is, upward and downward along which the electrode plate 750 and the separator 760 used to form the electrode assembly 780 are stacked. For example, the arrangement of guide portions 715 may include guiding pins projected from the bottom of the battery case 710.

The arrangement of guide portions 715 may be formed in a column form having a semi-circular cross section. As the arrangement of guide portions 715, which control assembling positions of the electrode plate 750 and the separator 760, are formed in a semi-circular form, arbitrary rotation of the electrode plate 750 and the separator 760 may be controlled. For example, the electrode plate 750 and the separator 760 may be prevented from arbitrarily rotating with respect to the arrangement of guide portions 715 by using a single arrangement guide portion 715 and dislocation between the electrode plate 750 and the separator 760 may also be prevented.

The position and arrangement of through voids 755 that perforate the laterally opposite terminal edge margins 750 that terminate the majority of the surface area bearing the active electrode material, are perforated in a direction of stacking of the electrode assembly 780 may be prepared for insertion into the arrangement of guide portions 715 in the electrode plate 750, including a positive plate 751 and a negative plate 752, and into the separator 760. For example, the position and arrangement of through voids 755 may be semi-circular holes so as to be conformable with the cross-sectional shape and orientation of guide portions 715.

The arrangement of guide portions 715 may be formed to correspond to the position, orientation, placement and arrangement of through voids 755. For example, the position and arrangement of through voids 755 may be formed in four corners of the electrode plate 750 and the separator 760 in correspondence to the arrangement of guide portions 715 formed in four corners of the bottom of the battery case 710.

Figure 18:
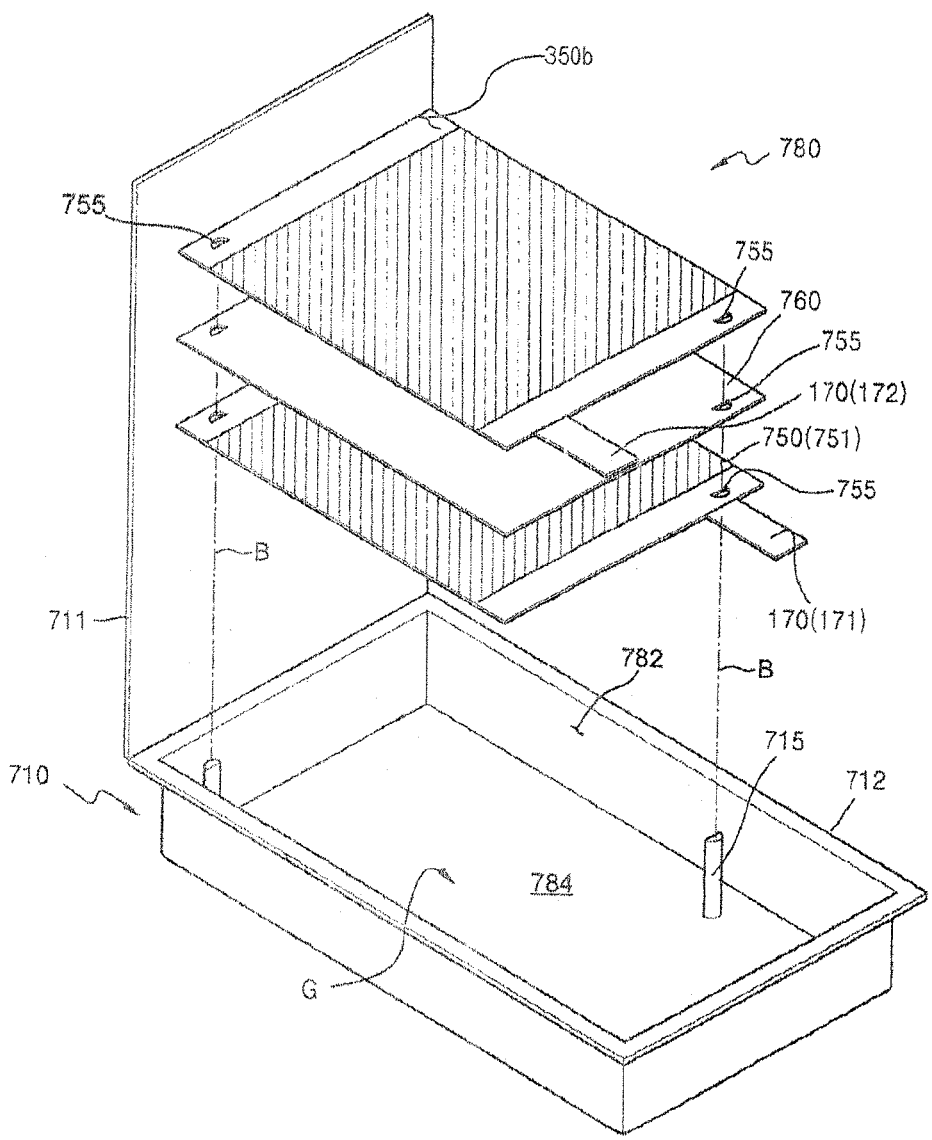
FIG. 18 is an exploded assembly view illustrating a battery, constructed as an embodiment of the present invention.

FIG. 18 is an exploded assembly view illustrating a battery, constructed as an one exemplary embodiment of the principles of the present invention, and FIG. 19 is an exploded assembly view illustrating another exemplary embodiment of a battery. Guide portion 715, constructed as the elongated posts shown, and case 710 may be integrally created simultaneously together as a monolithic unit. An electrode assembly 780 is assembled by stacking positive electrode plate 751, negative electrode plate 352, and separator 360 disposed between the positive electrode plate 751 and the negative electrode 752, with each of the positive electrode plate 751, the negative electrode plate 752 and the separator 760 bearing a majority of their respective major surface areas interposed between opposite terminating edges 350b of a non-coated portion 350b upon which no active material is coated. The majority of the respective major surface areas of positive electrode plate 751 and negative electrode plate 352 lying between opposite terminating edges 350b, are coated with active material. The uncoated opposite terminating edges 350b are both perforated outside of the majority by a plurality of discrete and corresponding through voids 755, 455 at locations within the edges 350b aligned along axes B by the respective guide portion 715, 315 during stacking of the positive electrode plate, the negative electrode plate, and the separator within the case.

Through voids 755 shown in FIG. 18 may be constructed with semicircular geometric shapes formed within edges 350b that conform to the cross-sectional shapes of posts 715. Through voids 755 are axially aligned along axes B as the positive electrode plate, the negative electrode plate, and the separator are stacked within case 310. Through voids 455 shown by FIG. 19 may be constructed with rectilinear geometric shapes, such as notches 455 formed within edges 350b that are axially aligned along axes B as the positive electrode plate, the negative electrode plate, and the separator are stacked within case 310.

In an alternative exemplar, the voids 755, 455 may be formed as a plurality of holes that perforate corner portions of edges that form part of an active material layer 350c, on which an active material is coated on the positive electrode plate and the negative electrode plate, unlike the electrode assemblies 780, 380 shown in FIGS. 18 and 19, and the corresponding corner portions of the separator 760. Voids 755, 455 in these alternative embodiments, have either the through holes 755, or notches 455, formed in the linear shorter ones of the edges of the positive electrodes and the negative electrodes that bear the active materials.

The foregoing description explains the details of aspects and features of batteries that may be constructed according to the principles of the invention with an electrode assembly that has a positive electrode, a negative electrode and a separator disposed between the positive electrode and the negative electrode. Each of the positive electrode, the negative electrode and the separator bear geometrically aligned corresponding through voids that perforate both of the opposite edges, and are stacked seriatim along a guide portion, within a surrounding case.

The guide portion and the surrounding case are integrally created simultaneously together as a single monolithic unit, to align the separator with the positive and negative electrode plates during the stacking of the separator, the positive electrode plate, and the negative electrode plate. This integrated structural creation of the guide portion and the case facilitates fabrication of the battery while assuring continued operational alignment of the separator, positive electrode plate and negative electrode plate both ab initio during their stacking, and subsequent to completion of the fabrication, throughout the numerous cycles of charging and discharging as well as the exposure of the battery to the hazards, impulse forces and hostile environment attendant to a mobile environment.

Structural aspects of the guide portion and the corresponding through voids may be located in pairs directly across from one another, on opposite edges of the separator, negative electrode and positive electrode, in order to place a majority of the area of the major surfaces of the positive and negative electrode plates in between the directly opposite pairs of through voids.

Alternatively, structural aspects of the guide portion and the corresponding through voids may be located in pairs diagonally across from one another, on opposite edges of the separator, negative electrode and positive electrode, in order to place a majority of the area of the major surfaces of the positive and negative electrode plates in between the diagonal pairs.

A plurality of corresponding through holes may perforate opposite edge margins of each of the positive electrode, the negative electrode and the separator, and the guide portion may be formed to have an array of posts conforming in shape to the corresponding holes and to extend from the base of the interior of the case substantially parallel to a direction of stacking of the positive electrode, negative electrode and separator into the interior of the case. This enables the stack of the positive electrode, negative electrode and separator to lie directly upon the surface of the base, without some aspect of the guide portion obstructing the direct engagement of the electrode assembly and the base.

The posts in the array may be positioned spaced slightly apart from the interior side walls of the case in order to place a majority of the area of the major surfaces of the positive and negative electrode plates in between and the directly opposite and diagonally opposite pairs of the posts, without obstruction by the posts.

Alternatively, a plurality of corresponding notches may perforate edges of each of the positive electrode, the negative electrode and the separator, and the guide portions may be constructed as indents of the side walls of the case that extend perpendicularly from opposite side walls within an interior of the case, with adjoining surfaces of the guide portion extending from a base of the case substantially parallel to a direction of stacking of the positive electrode, negative electrode and separator into the interior of the case. This enables the stack of the positive electrode, negative electrode and separator to lie directly upon the surface of the base, without some aspect of the guide portion obstructing the direct engagement of the electrode assembly and the base.

The indents of the side walls forming the guide portion may be positioned to extend only slightly away from the interior side walls of the case in order to place a majority of the area of the major surfaces of the positive and negative electrode plates in between and the directly opposite and diagonally opposite pairs of the posts, without obstruction by the posts.

Other exemplars may be fabricated with a plurality of holes perforating corner portions of the opposite edges of the positive electrode and the negative electrode that bear active materials and corner portions of the separator, or with the notches formed in the linearly shorter ones of said opposite edges of the positive electrodes and the negative electrodes that bear the active materials.

Batteries constructed in accordance to these principles contemplate that the stack-ability of electrode assemblies formed by stacking a plurality of positive electrodes, negative electrodes and separators will be facilitated, battery stability will be improved, and output performance of the batteries concomitantly enhanced.

The integrated creation of the guide portion and the case preserves the thin width, and the overall compactness of the battery upon completion of fabrication, while assuring the initial alignment of the separator, positive electrode plate and negative electrode during stacking, and the preservation of that alignment during the operational life of the battery.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery comprising:
    an electrode assembly comprised of a positive electrode, a negative electrode and a separator disposed between the positive electrode and the negative electrode, each of the positive electrode, the negative electrode and the separator having through voids along edges, one of the positive electrode and the negative electrode including an electrode current collector and an active material layer formed on the electrode current collector, the electrode current collector of the one of the positive electrode and the negative electrode having an active material non-coated portion on which the active material layer is not formed, the through voids of the one of the positive electrode and the negative electrode being formed on the active material non-coated portion of the electrode current collector of the one of the positive electrode and the negative electrode, the through voids of the positive electrode overlapping with the through voids of the negative electrode;
    a case accommodating the electrode assembly; and
    a guide portion integrally formed with the case, the guide portion engaging the through voids of the positive electrode and the negative electrode together to align the separator with the positive and negative electrodes.

2. The battery of claim 1, comprised of the through voids being located diagonally across from the electrode assembly.

3. The battery of claim 1, comprised of the guide portion extending from an interior of the case in a direction substantially parallel to a direction of stacking of the positive electrode, the negative electrode and the separator into an interior of the case.

4. The battery of claim 1, comprised of the through voids comprising a plurality of holes; and the guide portion comprising an array of posts.

5. The battery of claim 4, wherein another of the positive electrode and the negative electrode includes an electrode current collector and an active material layer formed on the electrode current collector, the electrode current collector of said another of the positive electrode and the negative electrode having an active material non-coated portion on which the active material layer is not formed, the holes of the through voids of said another of the positive electrode and the negative electrode being formed on the active material non-coated portion of the electrode current collector of said another of the positive electrode and the negative electrode; and the posts have shapes conforming to the holes and spaced-apart from side walls of the case to extend from the interior of the case in a direction substantially parallel to a direction of stacking of the positive electrode, the negative electrode and the separator into the interior of the case.

6. The battery of claim 4, wherein the holes perforate portions of edges of another of the positive electrode and the negative electrode that has an active material; and the posts have shapes conforming to the corresponding holes and spaced-apart from side walls of the case to extend into an interior of the case in a direction substantially parallel to a direction of stacking of the positive electrode, the negative electrode and the separator into the interior of the case.

7. The battery of claim 1, wherein the through voids comprise a plurality of corresponding holes perforating portions of the positive electrode and the negative electrode and corresponding portions of the separator;

the case comprises an inner layer and an outer layer stacked on each other, the inner layer and the outer layer each comprising at least an insulation film; and the guide portion comprises an array of posts formed from the inner layer and the outer layer, the inner and the outer layer forming the posts altogether, and shapes of the posts conforming to the corresponding holes and spaced-apart from side walls of the case substantially parallel to a direction of stacking of the positive electrode, the negative electrode and the separator into an interior of the case.

8. The battery of claim 1, wherein the through voids comprise a plurality of corresponding holes perforating portions formed on the positive electrode and the negative electrode and corresponding portions of the separator;

the case comprises an inner layer and an outer layer stacked on each other, the inner layer and the outer layer comprising at least an insulation film; and the guide portion comprises an array of posts formed from the inner layer with the inner layer deformed to extend into an interior, and the outer layer separated from the inner layer at the portions of the posts and extending through the exterior of the case, shapes of the posts conforming to the corresponding holes and spaced-apart from side walls of the case to extend into the interior of the case substantially parallel to a direction of stacking of the positive electrode, the negative electrode and the separator into the interior of the case.

9. The battery of claim 1, comprised of the guide portion comprising an array of detents protruding from side walls of the case and extending into an interior of the case substantially perpendicularly to a direction of stacking of the positive electrode, the negative electrode and the separator into the interior of the case.

10. The battery of claim 1, wherein the through voids comprise a plurality of notches formed in edges of the positive electrode, the negative electrode and the separator; and the guide portion comprises an array of detents, shapes of the detents conforming to the notches, the posts protruding from side walls of the case and extending into an interior of the case substantially perpendicularly to a direction of stacking of the positive electrode, the negative electrode and the separator into the interior of the case.

11. The battery of claim 1, wherein the through voids comprise a plurality of notches formed in edges of the positive electrode, the negative electrode and the separator; and the case comprises a plurality of side walls surrounding peripheries of the electrode assembly, and the guide portion comprises portions of the sidewalls forming detents, the shapes of the detents conforming to the notches, protruding into an interior of the case substantially perpendicularly to a direction of stacking of the positive electrode, the negative electrode and the separator into the interior of the case.

12. The battery of claim 1, wherein the through voids comprise a plurality of notches formed in edges of another of the positive electrode and the negative electrode that has an active material; and the case comprises a plurality of side walls surrounding peripheries of the electrode assembly, and the guide portion comprises portions of the sidewalls forming detents, the shapes of the detents conforming to the notches, the detents protruding into an interior of the case substantially perpendicularly to a direction of stacking of the positive electrode, the negative electrode and the separator into the interior of the case.

13. The battery of claim 1, wherein the through voids comprise a plurality of notches, another of the positive electrode and the negative electrode including an electrode current collector and an active material layer formed on the electrode current collector, the electrode current collector of said another of the positive electrode and the negative electrode having an active material non-coated portion on which the active material layer is not formed, the notches of the through voids of said another of the positive electrode and the negative electrode being formed on the active material non-coated portion of the electrode current collector of said another of the positive electrode and the negative electrode; and the case comprises a plurality of side walls surrounding peripheries of the electrode assembly, and the guide portion comprises portions of the sidewalls forming detents, the shapes of the detents conforming to the notches, the detents protruding into an interior of the case substantially perpendicularly to a direction of stacking of the positive electrode, the negative electrode and the separator into the interior of the case.

14. The battery of claim 1, wherein the through voids comprise a plurality of notches formed in edges of the positive electrode, the negative electrode and the separator; and the case comprises a plurality of side walls surrounding peripheries of the electrode assembly, and the guide portion comprises portions of the sidewalls protruding from the side walls substantially perpendicularly to a direction of stacking of the positive electrode, the negative electrode and the separator into the interior of the case, and extending concavely inwardly and into an interior of the case from exteriors of the sidewalls and forming detents conforming in shape to the corresponding notches.

15. The battery of claim 1, wherein the through voids comprise a plurality of notches formed in edges of the positive electrode, the negative electrode and the separator; and the case comprises a plurality of side walls formed by substantially coextensive inner and outer layers surrounding peripheries of the electrode assembly, and the guide portion comprises portions of the inner layers departing from the coextensive relation with the outer layer and forming detents conforming in shape to the notches protruding into the interior of the case and extending from a base of the case substantially perpendicularly to a direction of stacking of the positive electrode, the negative electrode and the separator into the interior of the case.

16. A battery of claim 1, wherein the through voids perforating each of the positive electrode, the negative electrode, and the separator have a semicircular shape; and the guide portion has a cross-sectional shape conforming to the through voids perforating the positive electrode, the negative electrode, and the separator.

17. The battery of claim 1, comprised of the through voids located at central regions along directly opposite edges of the electrode assembly.

18. The battery of claim 1, wherein the through voids comprise a plurality of holes perforating corner portions of the separator and corner portions of the edges of another of the positive electrode and the negative electrode that have active materials.

19. The battery of claim 12, wherein the notches are formed in linearly shorter ones of said edges of said another of the positive electrodes and the negative electrodes that has an active material.

* * * * *